L. E. UNDERWOOD & S. R. BERGMAN.
DYNAMO ELECTRIC MACHINE.
APPLICATION FILED OCT. 10, 1908.

946,813.

Patented Jan. 18, 1910.
2 SHEETS—SHEET 1.

Witnesses:
Irving E. Steers.
J. Ellis Elen.

Inventors
Louis E. Underwood,
Sven R. Bergman,
by _____ Att'y

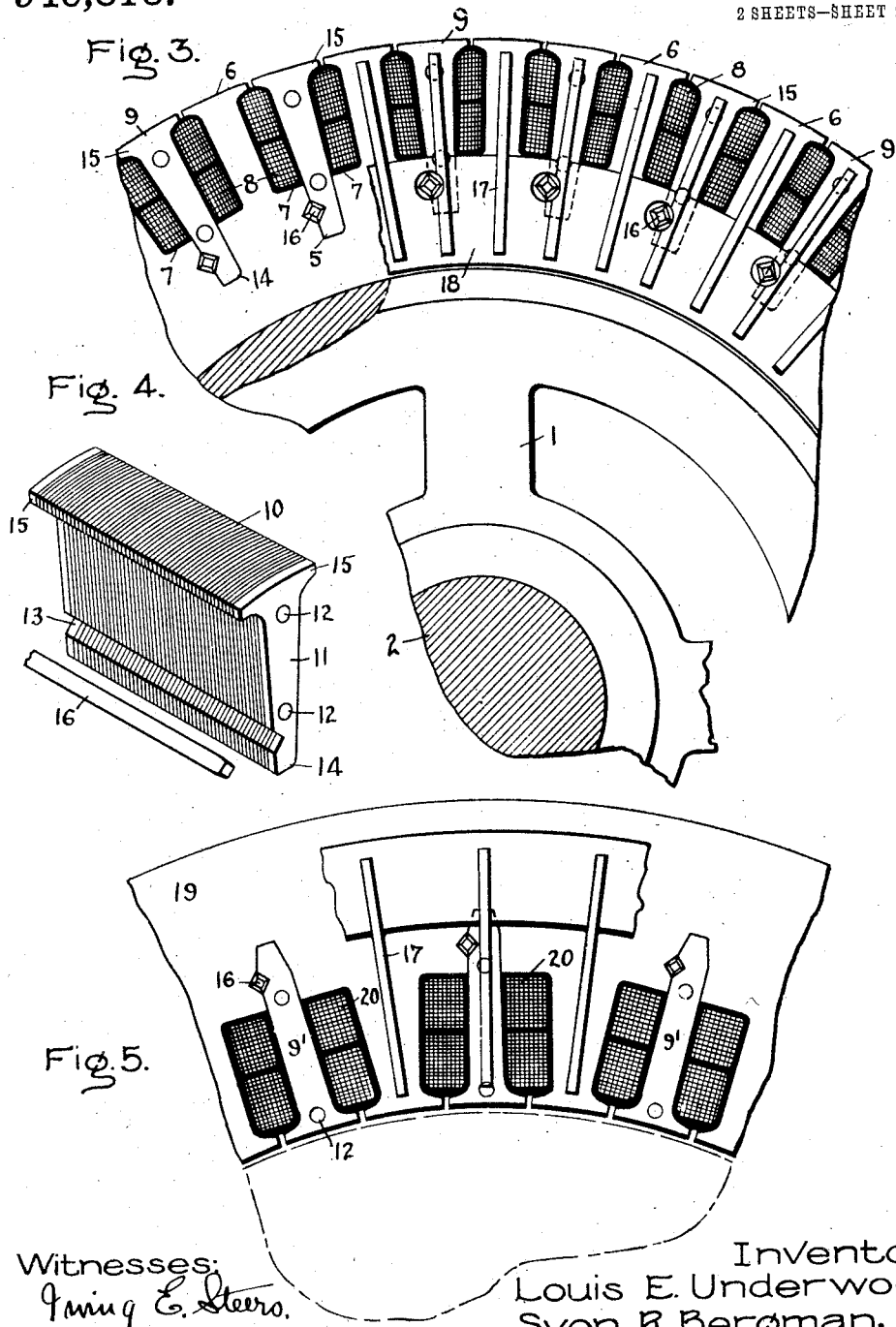

UNITED STATES PATENT OFFICE.

LOUIS E. UNDERWOOD AND SVEN R. BERGMAN, OF LYNN, MASSACHUSETTS, ASSIGNORS TO GENERAL ELECTRIC COMPANY, A CORPORATION OF NEW YORK.

DYNAMO-ELECTRIC MACHINE.

946,813.

Specification of Letters Patent. Patented Jan. 18, 1910.

Application filed October 10, 1908. Serial No. 457,086.

*To all whom it may concern:*

Be it known that we, LOUIS E. UNDERWOOD, a citizen of the United States, and SVEN R. BERGMAN, a subject of the King of Sweden, residing at Lynn, county of Essex, State of Massachusetts, have invented certain new and useful Improvements in Dynamo-Electric Machines, of which the following is a specification.

Our invention relates to dynamo-electric machines, and more particularly to the construction of such a machine in which a core body is wound with formed coils, and has for its object a novel arrangement and construction of parts.

Our invention consists in a core body of a dynamo-electric machine having a number of axially extending slots, integral teeth separating some of said slots, removable teeth or members adapted to be inserted radially between the coils or conductors, these removable teeth having portions entering said slots in the core body which alternate with said integral teeth, and means for fastening said members to said core body.

Other features which characterize our invention are pointed out in the claims annexed to and forming a part of this specification. For a better understanding of our invention, however, reference may be had to the following description taken in connection with the accompanying drawings, in which—

Figure 2:
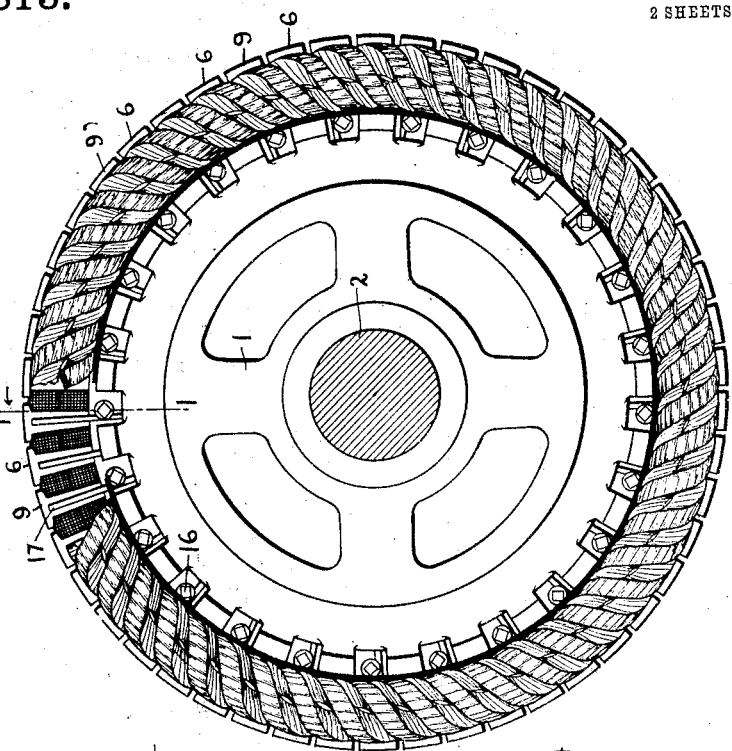
Figure 1:
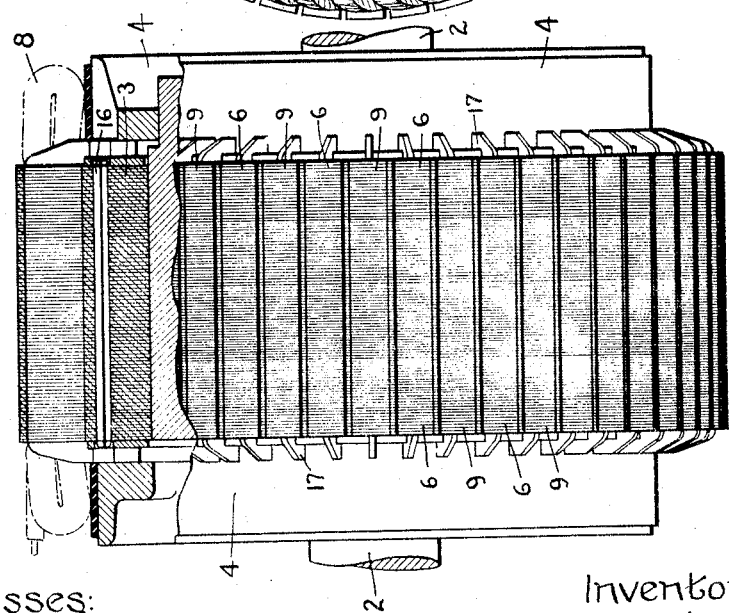

Figure 1 is a plan view of a revolving member of a dynamo-electric machine embodying our invention but with only one coil dotted in place, and is partly in section on the line 1—1 of Fig. 2 in order to show the interior construction; Fig. 2 is a view of a rotor similar to that shown in Fig. 1, with the coils in place; Fig. 3 is an enlarged view of a section of a rotor with a supporting end finger in place; Fig. 4 is a perspective view of a removable tooth and a key therefor; and Fig. 5 is a view of a portion of a stationary member of a dynamo-electric machine in which our invention is embodied.

Referring to Figs. 1 to 4 inclusive of the drawing, the spider 1 is mounted upon a shaft 2. The laminations 3 are mounted on the spider 1 between end members 4. The outer periphery of the laminations 3 has formed therein a series of slots 5 which are arranged parallel to the axis of the shaft 2 and are preferably wedge shaped. Between these slots 5 are integral projecting teeth 6 which, it will be seen from the drawing, alternate with the slots about the periphery of the laminations. On both sides of each of the slots 5 are axially extending surfaces 7 upon which the form wound coils 8 rest.

The winding for the rotor consists of a number of form wound coils 8 which the removable teeth or members 9 help to hold in place. In assembling the windings on the core, the conductors are placed on the surfaces 7 of the core body, portions of the coils engaging the integral teeth 6, and then the members 9 are inserted radially into position. These removable teeth or members 9 consist, preferably, of a bundle of T-shaped laminæ 10 clamped between end laminæ 11 of slightly greater thickness than the laminæ 10, by means of rivets 12 headed in the end laminæ 11. Each of these members 9 has a V-shaped groove 13 which lines up with a corresponding V-shaped groove in the side of each slot 5. When the members 9 have been inserted radially into place between the conductors, the wedge shaped ends 14 entering the wedge shaped slots 5 and the overhanging portions 15 engaging the coils, substantially rectangularly shaped keys 16 are driven into the V-shaped grooves in the removable teeth and the sides of the slots, which together form a substantially rectangular hole, and thus draw the wedge shaped ends 14 of the removable teeth down tightly into the wedge shaped slots 5 and hold the members 9 from displacement. The end supporting fingers 17 are fastened to a disk 18, and support the end laminæ of the members 9 and the end laminæ of the teeth 6. These end supporting fingers are of standard construction.

In Fig. 5, we have shown a stationary member 19 having coils 20 held in place by removable teeth or members 9' similar to the members 9 illustrated in the other figures of the drawing. The method of assembling a stationary member as shown is the same as that explained above for a rotating member.

What we claim as new and desire to secure by Letters Patent of the United States, is:—

1. In a dynamo-electric machine, a core having teeth integral therewith and axially extending wedge shaped slots in the body of the core between the teeth, a winding comprising form wound coils having portions engaging said integral teeth, removable teeth adapted to be inserted radially between said coil portions, said removable teeth having wedge shaped end portions adapted to fit said wedge shaped slots, and means for securing said removable teeth in place.

2. In a dynamo-electric machine, a core having teeth integral therewith and axially extending wedge shaped slots in the body of the core between the teeth, a winding comprising form wound coils having portions engaging said integral teeth, removable teeth adapted to be inserted radially between said coil portions, said removable teeth having wedge shaped end portions adapted to fit said slots, and keys adapted to draw said wedge shaped end portions of the removable teeth down tightly into the wedge shaped slots.

3. In a dynamo-electric machine, a core having teeth integral therewith and axially extending wedge shaped slots in the body of the core between the teeth, a winding comprising form wound coils having portions engaging said integral teeth, removable teeth adapted to be inserted radially between said coil portions, said removable teeth being wedge shaped at their lower ends to engage said wedge shaped slots and having V-shaped grooves which register with V-shaped grooves in the core body and keys adapted to be driven into the holes formed by said grooves in order to tightly draw down the wedge shaped ends of the removable teeth into the wedge shaped slots.

In witness whereof, we have hereunto set our hands this 8th day of October, 1908.

LOUIS E. UNDERWOOD.
SVEN R. BERGMAN.

Witnesses:
JOHN A. McMANUS, Jr.
EXERINE BIRD.